US012673585B2

(12) United States Patent
Austin et al.

(10) Patent No.: US 12,673,585 B2
(45) Date of Patent: Jul. 7, 2026

(54) VIBRATION SENSING STEERING WHEEL TO OPTIMIZE VOICE COMMAND ACCURACY

(71) Applicant: TOYOTA MOTOR ENGINEERING & MANUFACTURING NORTH AMERICA, INC., Plano, TX (US)

(72) Inventors: Benjamin Piya Austin, Saline, MI (US); George M. Evans, Ann Arbor, MI (US); Philip J. Babian, Canton, MI (US)

(73) Assignees: TOYOTA MOTOR ENGINEERING & MANUFACTURING NORTH AMERICA, INC., Plano, TX (US); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 245 days.

(21) Appl. No.: 18/062,128

(22) Filed: Dec. 6, 2022

(65) Prior Publication Data

US 2024/0185863 A1 Jun. 6, 2024

(51) Int. Cl.
B60N 2/02 (2006.01)
B60H 1/00 (2006.01)
(Continued)

(52) U.S. Cl.
CPC ....... B60N 2/0224 (2013.01); B60H 1/00757 (2013.01); B60R 16/0373 (2013.01);
(Continued)

(58) Field of Classification Search
CPC ... G10L 17/22; B60H 1/00757; B60N 2/0224; B60R 16/0373; E05Y 2400/45; E05Y 2400/85
See application file for complete search history.

(56) References Cited

U.S. PATENT DOCUMENTS 10,083,605 B2 9/2018 Sendhoff et al.
10,491,998 B1 * 11/2019 Kominar .................. H04R 3/12
(Continued)

FOREIGN PATENT DOCUMENTS

CN 103928026 A 7/2014
CN 216185093 U 4/2022
(Continued)

*Primary Examiner* — Brian L Albertalli
(74) *Attorney, Agent, or Firm* — HAYNES AND BOONE, LLP

(57) ABSTRACT

A system and method employ vibration sensors on board a vehicle to effectively identify and implement voice commands. The vibration sensors provide vibration signals corresponding to the speech of vehicle occupants to a controller. The controller may verify the content of the voice commands and identify a speaker of the voice commands with the vibration signals. The voice command may be implemented by operating a controlled device in a specific passenger zone of the vehicle. In some implementations, the speech of a specific occupant may be designated as voice commands to be transmitted over a videoconference or voice call and the speech of surrounding vehicle occupants may be designated as noise to be excluded from transmission. Further, driver voice commands may be given priority when conflicting commands are given by other vehicle passengers.

19 Claims, 4 Drawing Sheets

(51) Int. Cl.
    *B60R 16/037*         (2006.01)
    *G10L 17/22*         (2013.01)
    *E05F 15/70*         (2015.01)

(52) U.S. Cl.
    CPC .............. *G10L 17/22* (2013.01); *E05F 15/70*
         (2015.01); *E05Y 2400/45* (2013.01); *E05Y*
        *2400/85* (2013.01); *E05Y 2900/55* (2013.01)

(56)          References Cited

U.S. PATENT DOCUMENTS

| | | | |
|---|---|---|---|
| 10,971,143 B2 | 4/2021 | Song et al. | |
| 2014/0229174 A1* | 8/2014 | Graumann | G10L 15/183 |
| | | | 704/231 |
| 2015/0194151 A1* | 7/2015 | Jeyachandran | G10L 15/20 |
| | | | 704/233 |
| 2016/0171806 A1* | 6/2016 | Van Dyken | G06V 40/20 |
| | | | 367/199 |

| | | | |
|---|---|---|---|
| 2016/0267911 A1* | 9/2016 | Koetje | H04R 3/04 |
| 2019/0366844 A1 | 12/2019 | Yoon et al. | |
| 2020/0039456 A1* | 2/2020 | Wheeler | H04R 17/02 |
| 2021/0210063 A1* | 7/2021 | Zhang | H04R 3/005 |
| 2021/0217423 A1* | 7/2021 | Rakshit | G10L 15/22 |
| 2021/0255627 A1* | 8/2021 | Snyder | G01S 15/89 |
| 2021/0280042 A1* | 9/2021 | SungTae | G08B 21/0225 |
| 2021/0347328 A1 | 11/2021 | Bhattacharya et al. | |
| 2022/0116707 A1* | 4/2022 | Zyskowski | G06F 3/011 |
| 2022/0208193 A1* | 6/2022 | Klug | G10L 15/24 |
| 2023/0049919 A1* | 2/2023 | Du | G06F 3/162 |
| 2023/0382340 A1* | 11/2023 | Elad | G01S 13/04 |
| 2024/0153518 A1* | 5/2024 | Vondersaar | G10L 21/0216 |

FOREIGN PATENT DOCUMENTS

| | | | | |
|---|---|---|---|---|
| KR | 20140047985 A | 4/2014 | | |
| WO | WO-2023207704 A1 * | 11/2023 | | B60R 16/037 |

* cited by examiner

VIBRATION SENSING STEERING WHEEL TO OPTIMIZE VOICE COMMAND ACCURACY

FIELD OF THE DISCLOSURE

The present disclosure relates generally to speech recognition systems, vehicles employing such speech recognition systems and methods of controlling the speech recognition systems. Embodiments of the present disclosure include vibration sensors employed to improve a speech recognition rate of the systems.

BACKGROUND

Multi-user devices are often employed aboard vehicles that provide services to individual occupants in the vehicles. For example, an information center may be integrated in a passenger vehicle to provide navigation information, radio, DVD and other audio and video services to the driver and other occupants in both front and rear zones of the vehicle. Additionally, heating, ventilation, and air conditioning (HVAC) systems may be controlled to provide individualized temperature control for each occupant or each occupant zone. These and other vehicle systems offer personalized feature settings that may be selected for individual occupants aboard the vehicle.

To interface with these vehicle systems, a speech recognition system may be employed to receive and recognize spoken commands from the occupants of the vehicle. In some vehicles, the speech recognition system may include multiple microphones or steerable arrays to allow multiple occupants to provide commands to the multi-user devices. Often the identity of the occupant providing a voice command must be accurately identified for the intended service to be provided. Additionally, the voice commands of the speaker may need to be isolated from ambient noises and other speech detectable within the vehicle. It is therefore desirable to provide for a vehicle system and method that offers a user interface to accurately control systems on board a vehicle.

SUMMARY

In consideration of the above-described disadvantages, the present disclosure provides computer-implemented systems and methods for operating controlled devices on board a vehicle. A voice recognition system for operating the controlled device includes a microphone, at least one vibration sensor disposed in an interior of the vehicle, one or more processors and a computer readable medium. The computer readable medium stores instructions thereon that cause the one or more processors to receive audio signal data from the microphone, receive vibration signals from the one or more vibration sensors, detect a voice command from the audio signal data, match the voice command to a vibration sensor signature detected within the vibration signals and operate the controlled device in response to matching the voice command to the vibration sensor signature.

In certain illustrative embodiments of the present disclosure, the at least one vibration sensor is associated with one of a plurality of passenger zones defined within the interior of the vehicle, and the instructions cause the one or more processors to operate the controlled device within the one of the plurality of passenger zones. The controlled device may include an HVAC system, a navigation system, an entertainment system, an adjustable seat, a window, a telephone and/or a personal computer. The instructions may further cause the one or more processors to instruct the controlled device to transmit speech of an occupant of the one of the plurality of passenger zones and prohibit transmission of the speech of an occupant of a surrounding passenger zone.

In one or more example embodiments, the at least one vibration sensor includes at least a first vibration sensor supported on a steering wheel of the vehicle. In some embodiments, the at least one vibration sensor includes at least a second vibration sensor supported in a seat of the vehicle.

In some embodiments, the instructions further cause the one or more processors to update match criteria for matching the voice command to the vibration sensor signature in response to corrective action undertaken on the controlled device. In some embodiments, the instructions further cause the one or more processors to implement a machine learning model to update the match criteria. In some embodiments, the system further includes a camera, an ultrasonic sensor, a weight sensor and a radar system operably coupled to the one or more processors.

In other embodiments of the present disclosure, a computer-implemented method for operating a controlled device on board a vehicle includes receiving audio signal data from a microphone disposed in an interior of the vehicle, receiving vibration signals from one or more vibration sensors disposed within the interior of the vehicle, detecting a voice command from the audio signal with a voice recognition routine, matching the voice command to a vibration sensor signature within the vibration signals data with at least one processor and operating a controlled device in response to matching the voice command to the vibration sensor.

In at least some other embodiments of the present disclosure, a non-transitory computer-readable medium has machine-readable instructions stored thereon. The machine-readable instructions are executable to cause a machine to receive audio signal data from a microphone disposed in an interior of the vehicle, receive vibration signals from one or more vibration sensors disposed within the interior of the vehicle, detect a voice command from the audio signal with a voice recognition routine, match the voice command to a vibration sensor signature within the vibration signals data with at least one processor and instruct a controlled device to operate in response to matching the voice command to the vibration sensor signature.

It is to be understood that both the foregoing general description and the following detailed description are exemplary and explanatory in nature and are intended to provide an understanding of the present disclosure without limiting the scope of the present disclosure. In that regard, additional aspects, features, and advantages of the present disclosure will be apparent to one skilled in the art from the following detailed description.

DESCRIPTION OF ILLUSTRATIVE EMBODIMENTS

Illustrative embodiments and related methods of the present disclosure are described below as they might be employed in a system and method for enhancing the recognition voice commands issued on board a vehicle and identifying the speaker of the voice commands such that the voice commands may be properly implemented. In the interest of clarity, not all features of an actual implementation or method are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments and related methods of the disclosure will become apparent from consideration of the following description and drawings.

As described herein, methods and systems of the present disclosure detect vibration signals from one or more vibration sensors associated with one or more passenger zones in a vehicle. A voice command is matched to the vibration signals to ensure the accuracy and proper implementation of the voice command. In some implementations, an occupant of the vehicle issuing the voice command is identified based on the passenger zone in which the vibration signals were detected, and the voice command may be prioritized and implemented based on the occupant identified.

Figure 1:
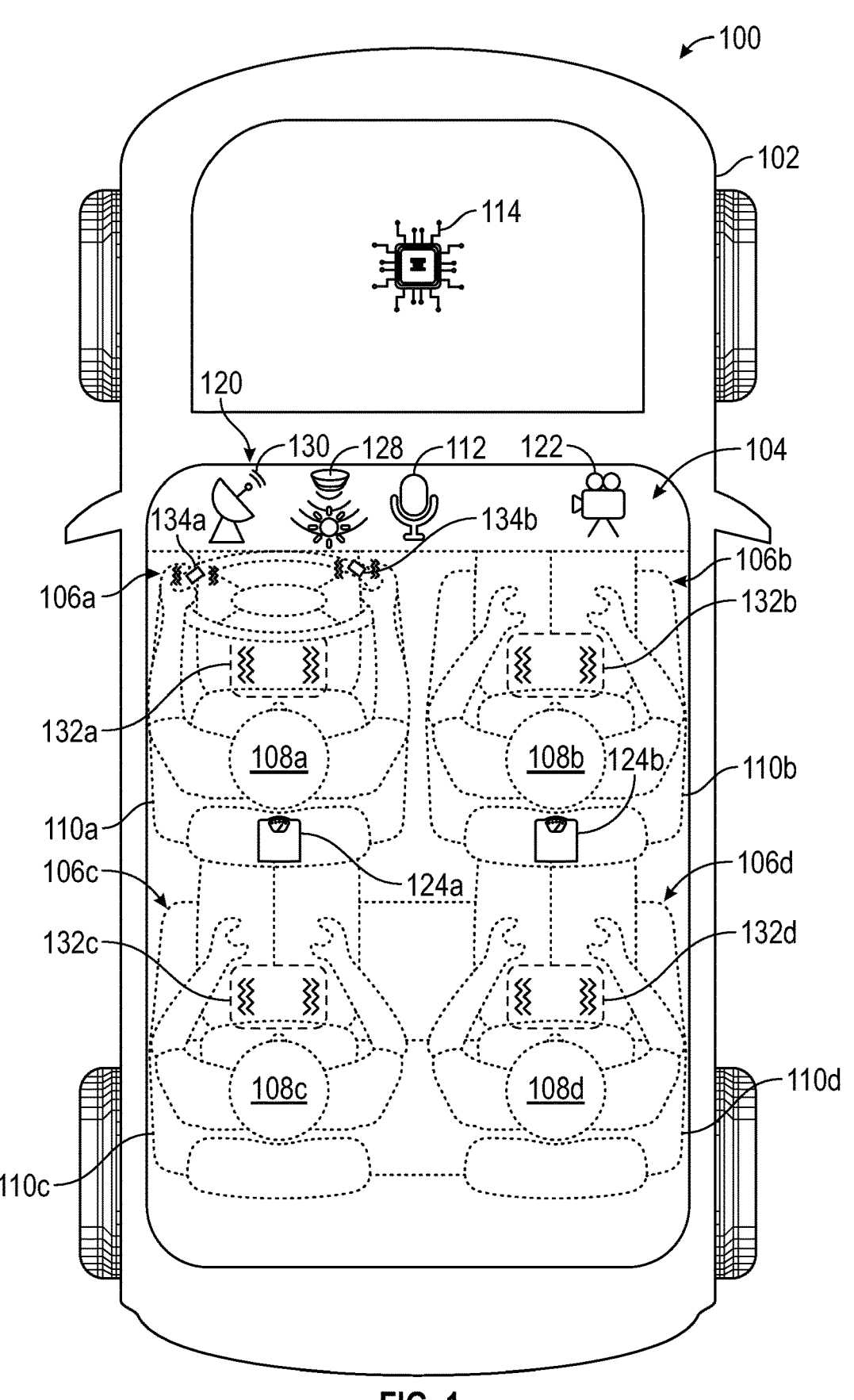
FIG. 1 is a top view of a personal vehicle with a speech recognition system including one or more vibration sensors according to example embodiments of the present disclosure.

FIG. 1 is a top view of a voice recognition system 100 for operating a controlled device on board a vehicle 102 according to the certain illustrative embodiments of the present disclosure. An interior 104 of the vehicle 102 may include any number of predefined passenger zones therein. For example, the passenger zones can include a front seat driver side zone 106a, a front seat passenger side zone 106b, a backseat driver side zone 106c, and a backseat passenger side zone 106d. Alternate configurations of passenger zones are contemplated for use in other embodiments (see FIG. 4, for example). Occupants 108a, 108b, 108c, 108d (collectively, occupants 108) are illustrated in phantom as seated on seats 110a, 110b, 110c, 110d (collectively, seats 110) respectively disposed in each of the passenger zones 106a. 106b, 106c. 106d (collectively, passenger zones 106).

The voice recognition system 100 includes at least one microphone 112 disposed within the interior 104 of the vehicle 102. As illustrated, the microphone 112 is located within the front seat driver side zone 106a such that a voice command issued by the occupant 108a may be received by the microphone 112. In other embodiments, the microphone 112 may be an omnidirectional microphone positioned centrally within the interior 104 to receive voice commands from any occupant 108a, 108b, 108c, 108d regardless of whether the occupant 108a, 108b, 108c, 108d issuing the voice command directs their speech at the microphone 112.

In other embodiments, multiple microphones 112 may be provided throughout the interior 104 without departing from the scope of the disclosure.

A controller 114 is operably coupled to the microphone 112. As illustrated, the controller is housed outside the interior 104 of the vehicle 102 and may be housed anywhere on or within the vehicle 102. In other embodiments, the controller 114 or components thereof may be disposed remote from the vehicle 102 and may be communicably coupled to the vehicle 102 by a cellular or other network without departing from the scope of the disclosure. The controller 114 receives and processes audio data provided by the microphone 112. For example, the controller 114 may include circuitry or electronics to parse the speech of the occupants 108a, 108b, 108c. 108d and identify any voice commands issued within the parsed speech. The controller 114 may also issue commands to one or more controlled devices 118 (FIG. 2) based on the identified voice commands as described in greater detail below.

The controller 114 is also operably coupled to a plurality of occupant sensors 120, which are operable to detect characteristics, activity and other information regarding occupants 108a, 108b, 108c, 108d. Occupant sensors 120 may include a camera 122 and weight sensors 124a, 124b (collectively, weight sensors 124). The camera 122 may be supported by a ceiling or dashboard of the vehicle 102 and may provide photographic and/or video data to the controller 114. The photographic and/or video data may include lip activity each of the occupants 108a, 108b, 108c, 108d issuing voice commands. The weight sensors 124a. 124b may be deployed in seats 110a, 110b for detecting a weight of an occupant 108a, 108b or other object placed on the seats 110a, 110b. The occupant sensors 120 may also include one or more ultrasonic detectors 128, which can provide ultrasonic data indicative of changes in the position of the mouths of occupants 108a, 108b, 108c, 108d, and one or more radar systems 130 disposed on the interior 104 of the vehicle. The radar system 130 may include a millimeter wave radar sensor operable to detect breathing patterns of the occupants 108a, 108b, 108c, 108d or other movements indicative of a voice command being issued.

The occupant sensors 120 may also include one or more vibration sensors 132a, 132b, 132c, 132d (collectively vibration sensors 132) disposed within each of the respective passenger zones 106a, 106b, 106c, 106d. The vibration sensors 132 may be supported within seats 110a, 110b, 110c, 110d where vibrations generated by the speech of one particular occupant 108a, 108b, 108c, 108d may be transmitted through the body of that particular occupant 108a, 108b, 108c, 108d and detected by the corresponding vibration sensor 132a, 132b, 132c, 132d. In other embodiments, vibration sensors may also be positioned inside foot pedals, armrests, headrests or seat belts to detect chest vibrations. The vibration sensors 132 provide data indicative of the speech of the occupants 108a, 108b, 108c, 108d to the controller 114. The controller 114 may distinguish between vibrational data indicative of the speech of an occupant 108a in the front seat driver side zone 106b from vibrational data indicative of the speech of other occupants 108b, 108c, 108d. For example, since the body occupant 108a is adjacent the vibration sensor 132a, but spaced from vibration sensors 132b, 132c, 132d, vibrations generated by the speech of the other occupants 108b, 108c, 108d must travel through the air or another medium to reach the vibration sensor 132a. Thus, vibration data indicative of a voice command issued by a particular occupant 108a, 108b, 108c, 108d may be distinguishable by comparing the vibration data received from each vibration sensor 132*a*, 132*b*, 132*c*, 132*d* and/or vibration sensors 134*a*, 134*b* (collectively, vibration sensors 134) disposed in the front seat driver side passenger zone 106*a*. In other embodiments the vibration sensors may also be located in armrests or headrests.

Vibration sensors 134*a*, 134*b* are supported by a steering wheel 136 of the vehicle 102. The vibration sensors 134*a*, 134*b* detect vibrations generated by the speech of the occupant 108*a* front seat driver side zone 106*a*, which are transmitted through the body of the occupant 108*a*. The vibration sensors 134*a*, 134*b* may be at least partially isolated from vibrations generated by the speech of other occupants 108*b*, 108*c*, 108*d* traveling through the air or other medium by the hands of the occupant 108*a* grasping the steering wheel 136.

Figure 2:
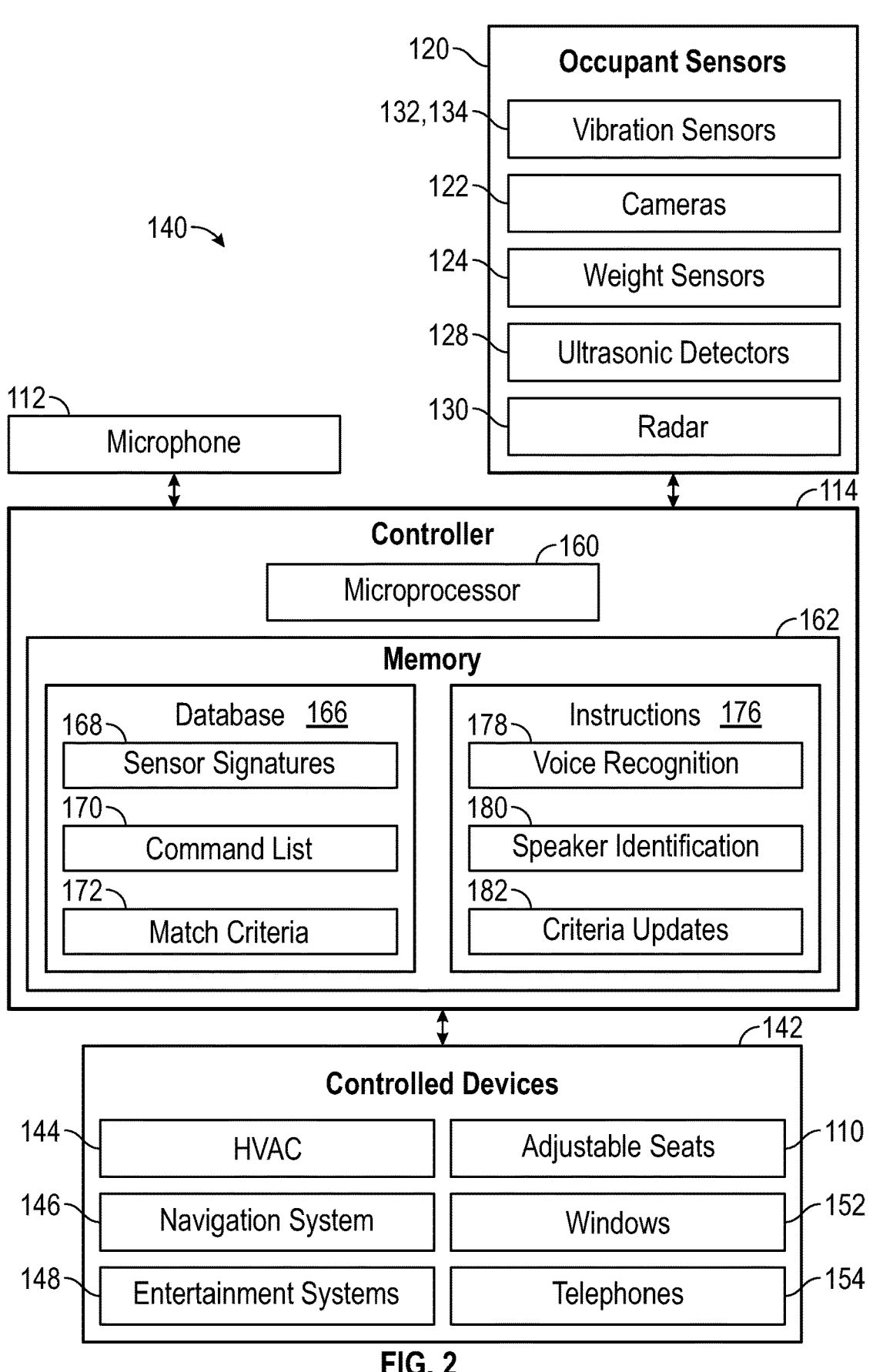
FIG. 2 is a block diagram schematically illustrating a control system employing the speech recognition system of FIG. 1 to adjust a plurality of controlled devices aboard the vehicle.

Referring now to FIG. 2, and with continued reference to FIG. 1, a system 140 is illustrated for controlling a plurality of controlled devices 142 with the voice recognition system 100. The controlled devices 142 may include, for example, an HVAC system 144, a navigation system 146, entertainment systems 148, adjustable seats 110*a*, 110*b*, 110*c*, 110*d*, windows 152, and/or cellular telephones 154, each of which may be responsive to voice commands received and processed by the voice recognition system 100. For example, the HVAC system 144 may be responsive to voice commands from any one of the occupants 108*a*, 108*b*, 108*c*. 108*d* to adjust settings such as temperature, fan speed, humidity, etc. for an individual passenger zone 106*a*, 106*b*, 106*c*, 106*d* (FIG. 1). The navigation system 106 may be responsive to a voice command from the occupant 108*a* in the front seat driver side zone 108*a* to set a destination or to display preferred information and the entertainment systems 148 may be responsive to voice commands from occupants 108*c*, 108*d* in the backseat zones 106*c*. 106*d* to display video programming, play music or perform similar functions. The positions or orientations of adjustable seats 110*a*, 110*b*, 110*c*, 110*d* and windows 152 may be set or adjusted by voice commands from a corresponding occupant 108*a*, 108*b*, 108*c*, 108*d*, or by an occupant 108*a*, 108*b*, 108*c*, 108*d* in a different passenger zone 106*a*, 106*b*, 106*c*, 106*d*. Other features of the vehicle 102 such as adjustable rear-view mirrors, adjustable steering wheel and pedals (not shown) and various other vehicle systems and devices may also be responsive to voice commands received and processed by the voice recognition system 100.

Telephones 154, personal computers and/or other personal devices may also be responsive to the voice recognition system 100. The telephones 154 may be communicably coupled to the controller 114 through short-range wireless communication protocols, or by wired connections established by the occupants 108*a*, 108*b*, 108*c*, 108*d*.

The controller 114 includes a microprocessor 160 and a memory 162. Any processor or microprocessor and memory capable of storing data, processing the data, executing routines and other functions described herein may be employed. As described herein, a processor or microprocessor includes any device capable of executing machine readable instructions. Accordingly, the microprocessor 160 may be an integrated circuit, a microchip, a computer, or any other computing device. The memory 162 may include RAM, ROM, a flash memory, a hard drive, or any device capable of storing machine readable instructions. The controller 114 processes the various inputs from the microphone 112 and occupant sensors 120 and provides control output signals to any of the controlled devices 142.

The memory 162 includes a database 166 in which information used by the voice recognition system 100 is stored. The database 166 includes sensor signatures 168 corresponding to each voice command in a command list 170. Each voice command in the command list 170 may produce data from the microphone 112 and each of the occupant sensors 120. For example, a voice command issued by occupant 106*a* will generate audio signal data provided by the microphone 112 to the controller 114 and vibration signals provided by each of the vibration sensors 132*a*, 132*b*, 132*c*, 132*d*, 134*a*, 134*b* to the controller 144. A different sensor signature 168 for the voice command issued by occupant 106*a* may be stored in the database 166 including the data expected to be detected by the microphone 112 and each of the vibration sensors 132*a*, 132*b*, 132*c*, 132*d*, 134*a*, 134*b*. Sensor signatures 168 may be preprogrammed into the database 166 and/or input by an occupant 108*a*, 108*b*, 108*c*, 108*d* in some instances.

In certain illustrative embodiments, the system recognizes clothing articles (e.g., gloves) and takes this information into consideration during processing. For example, with gloves on, the vibration sensor in steering wheel may not receive adequate vibration to infer the driver is speaking. However, in one embodiment, the system (using camera 122, for example) determines the driver 108*a* is wearing winter gloves and takes this information into consideration, helping it to make a more accurate prediction. In such embodiments, just because the wheel vibration sensor is not receiving vibration does not mean that the driver is not the one giving the command, and the presently described system can predict/infer this.

A set of match criteria 172 may be stored in the database 166 which may provide a set of thresholds and/or instructions which may be used to identify when a voice command has been issued. The sensor data from the microphone 112 and the occupant sensors 120 may be compared to the sensor signatures 168 and a voice command may be identified when the match criteria 172 have been met.

The memory 162 also includes a set of instructions 176 therein. The instructions 176 include one or more voice recognition routines 178 for identifying the voice commands stored in the command list 170. Voice recognition routines are well-known to those skilled in the art for recognizing spoken grammar words. Voice recognition routines 178 may include recognition routines that are trainable to identify words spoken by one or more specific occupants 108*a*, 108*b*, 108*c*, 108*d* and may include personalized grammars. The instructions 176 may also include one or more speaker identification routines 180, which may operate to identify which one of the occupants 108*a*, 108*b*, 108*c*. 108*d* has issued a particular voice command based on the data provided by the microphone 112 and occupant sensors 120.

Criteria update routine 182 may be included to update the match criteria 172 when there has been an indication that a voice command may have been properly or improperly identified. The criteria update routine 182 may include instructions to implement a machine learning model that will improve the match criteria to more accurately identify the voice commands. The machine learning model may be a neural network that is trained with a data set including various sensor data for respective occupants 108*a*, 108*b*, 108*c*, 108*d* to learn specific voice commands and sensor signatures that do and do not indicate that a specific voice command has been issued.

Figure 3:
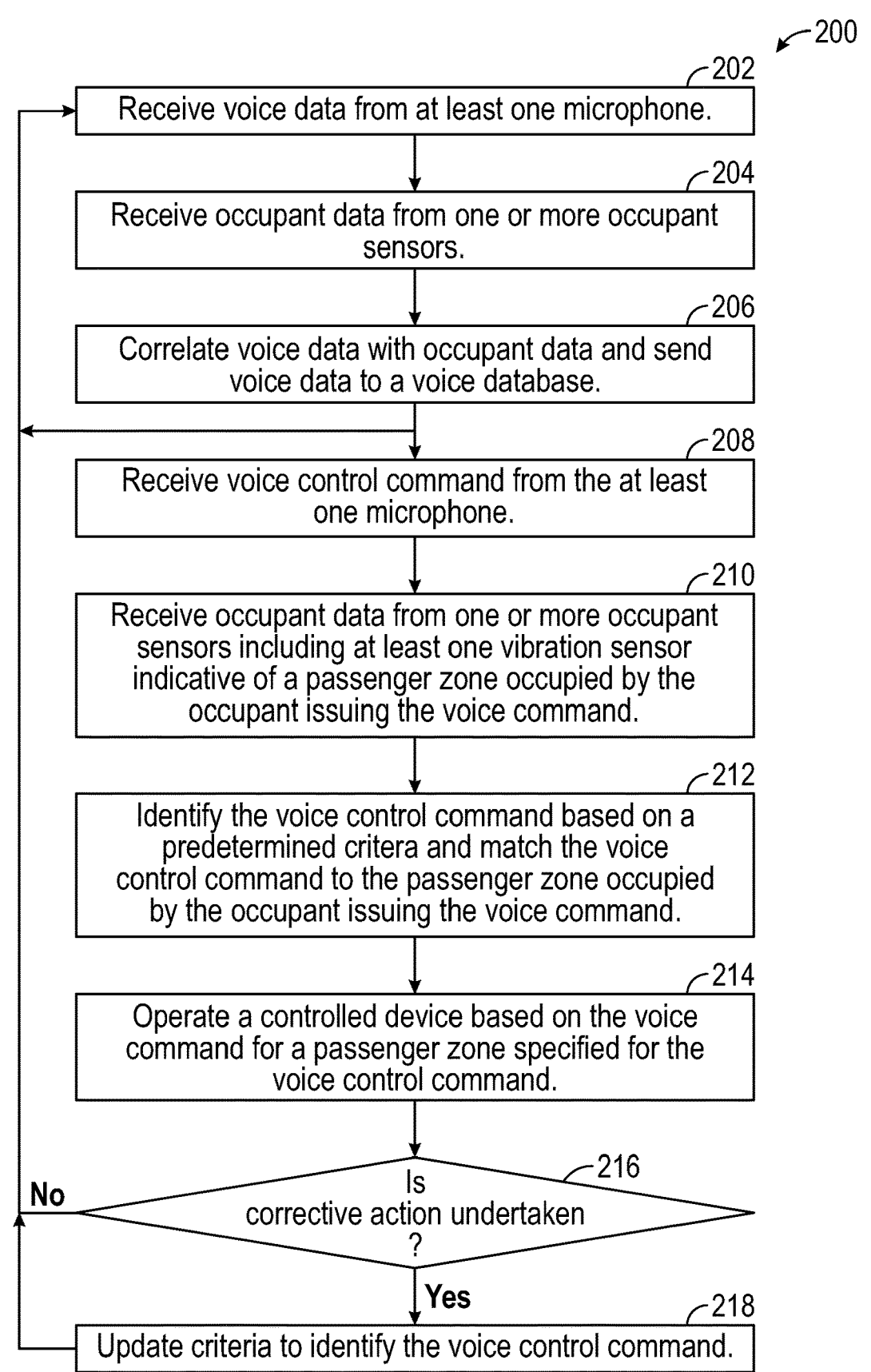
FIG. 3 is a flow chart illustrating a procedure for operating the controlled devices of FIG. 2 with the speech recognition system of FIG. 1.

Referring now to FIG. 3, and with continued reference to FIGS. 1 and 2, a method 200 for operating the controlled devices 142 with the speech recognition system 100 is illustrated. The procedure begins at block 202 where audio signal data or voice data is received from at least one microphone 112. The speech recognition system 100 may be arranged in an "always listening" configuration where any speech detectable by the microphone 112 may be analyzed for potential voice commands. In other embodiments, a button press or other manual trigger may be implemented to begin the collection of audio signal data voice data by the microphone 112. At block 204, occupant data is collected from one or more of the occupant sensors 120. For example, vibration data may be collected from the vibration sensors 132, 134 simultaneously with the collection of the audio signal data from the microphone. The audio signal data and data from the occupant sensors 120 may be correlated by the controller 114 any relevant portions may be sent to the database 166. For example, the voice recognition routine 178 of the controller 114 may review the audio signal data for various grammars that may or may not be used in a voice command. When a relevant grammar such as "window" or "heat" is identified, the vibrational data from the vibration sensors 132, 134 may be correlated to the audio signals and stored among the sensor signatures 168 in the database 166. In this manner, sample vibrational data may be collected that may be relied upon where these grammars used in a voice command may be obscured by noise or other simultaneous speech in the vehicle 102. Data from the other occupant sensors 120 such as the camera 122, ultrasonic sensor 128 and radar system 130 may similarly be collected, correlated and stored. Blocks 202 through 206 may be repeated continuously while normal speech is conducted in the vehicle.

The procedure 200 then proceeds to block 208 where a voice command is issued by an occupant 108 and the corresponding audio signal data is received by the at least one microphone 112. For example, occupant 108a may issue a voice command such as "close my window," or "turn up the heat." At block 210, the corresponding vibrational data and other occupant sensor data is collected. At block 212 the voice command is identified by the voice recognition routine 178 and the occupant issuing the voice command may be identified by the speaker identification routine. For example, the vibrational data collected from vibration sensors 132a and 134, may be matched to sensor signatures 168 according to match criteria stored in the database 172. The data collected from the vibration sensors 132a and 134 not only confirms that occupant 108a was the occupant to issue the voice command, but also verifies the content of the voice command. For example, a vibrational sensor signature for the voice command "turn up the heat" may be matched to the vibrational data collected and a vibrational senor signal for the voice command "turn down the heat" may be distinguished. Thus, the voice command may be accurately identified even when the audio signal data may be incomplete or corrupted.

If the occupant 108a is identified as the speaker, the speaker identification routine 180 may review data collected by other occupant sensors to verify the identification. For example, the weight sensor 124a should detect the weight of occupant 108a in seat 110a if occupant 108a in fact issued the voice command. Lip activity of occupant 108a may be detected by the camera 122, changes in the position of the mouth of occupant 108a may be detected by the ultrasonic sensor 128 and breathing patterns may be detected by the radar system 130. This data may be compared to sensor signatures 128 for each of these corresponding sensors 122, 128, 130 to add certainty to the identification.

The procedure 200 then may proceed to block 214 where the controller 144 provides a control signal to operate the relevant controlled device 142. For example, if the voice command "turn up the heat" is detected and occupant 108a is identified as the speaker, the controller 114 may send a control signal to the HVAC system 144 to raise the temperature in the front driver side passenger zone 106a.

The procedure 200 may then proceed to decision 216 to determine if any corrective action is taken or if there is any other indication that the intended voice command was not properly implemented. For example, if the occupant 108a manually operates the HVAC system 144 to lower the heat within a predetermined time period after the voice command to "turn up the heat" was implemented, the controller 114 may determine that the voice command has been misidentified. The procedure 200 then proceeds to block 218 where the match criteria 172 may be updated by the criteria update routine 182. The criteria update routine may update the match criteria 172 according to an algorithm or machine learning model implemented by the criteria update routine 182. If no corrective action is taken, or if the criteria update for identifying the voice command is complete, the procedure 200 may return to block 202 where the voice recognition system 100 receives audio signal data from at least one microphone 112.

In certain other embodiments, if there are conflicting voice commands issued by the driver (108a) and another passenger in the vehicle, the system will automatically give priority to the driver 108a. In such embodiments, safety is improved by giving the driver voice commands priority.

Figure 4:
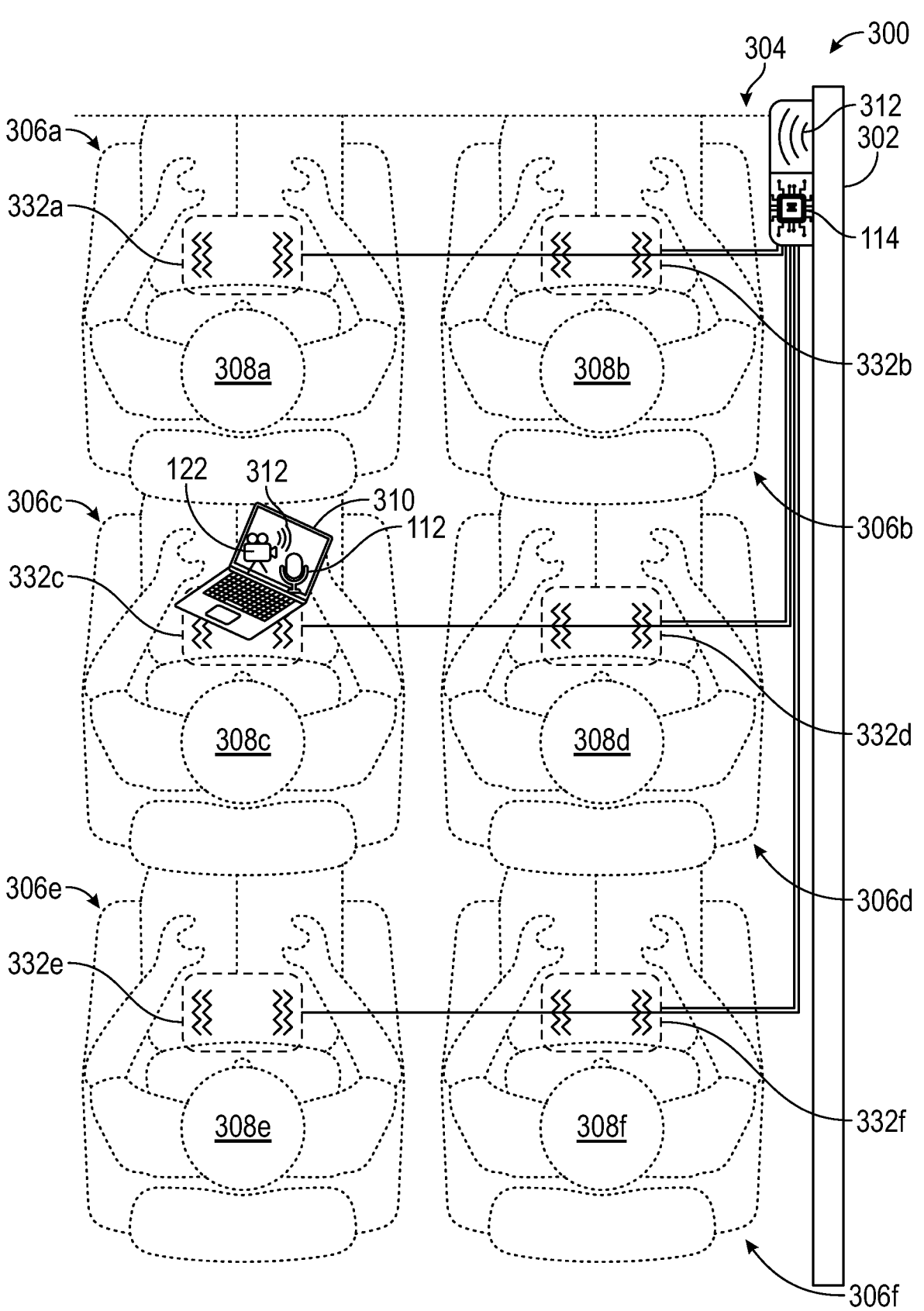
FIG. 4 is a top view of a transit vehicle including one or more vibration sensors arranged to interface with a portable speech recognition system according to alternate example embodiments of the present disclosure.

Referring to FIG. 4, an alternate embodiment of the present disclosure is illustrated in which a voice control system 300 is implemented on board a transit vehicle 302. The transit vehicle 302 may include a passenger bus or airplane, but in some embodiments, aspects of the voice control system 300 may be implemented in a personal automobile as well. An interior 304 of the vehicle 302 defines a plurality of passenger zones 306a, 306b, 306c, 306d, 306e, 306f, which accommodate respective occupants 308a, 308b, 308c, 308d, 308c, 308f (collectively, occupants 308) therein. The voice control system 300 may be employed, for example, to control the transmission of audio signals in a video conference or other communication though a personal device 310 such as a personal computer or smartphone. For example, the voice control system 300 may operate to transmit audio signals produced by occupant 308c through personal device 310, while excluding audio signals generated from the surrounding occupants 308a, 308b, 308d, 308c, 308f.

The personal device 310 may include at least one microphone 112 and camera 122 for conducting videoconference similar communications. The personal device 310 may be operably coupled to a controller 114 by a wireless network 312 or similar communicative link. The controller 114 is operatively coupled to a plurality of vibration sensors 332a, 332b, 332c, 332d, 332c, 332f (collectively vibration sensors 332), which are arranged adjacent to respective occupants 308a, 308b, 308c, 308d, 308c, 308f. As illustrated, the vibration sensors 332 are wired to the controller 114, and in other embodiments, the vibration sensors 332 may be wirelessly coupled to the controller by wireless network or similar connection.

In operation, the vibration sensor 332c detects vibrations produced by the speech of the occupant 308c. The speech of the occupant 308c is received by the microphone 112, and lip activity of the occupant 308c may be detected by the camera 112. Audio signal data representative of the speech of occupant 308c is provided to the controller 114 by the microphone, vibration signals are provided to the controller 114 by the vibration sensor 332c, and sensor data indicative of the lip activity of occupant 308c is provided to the controller 114 by the camera 122. The controller 114 may match the speech of occupant 308c to vibration sensor signatures 168 according to match criteria 172 stored in the controller 114. The controller 114 may thus designate the speech of the occupant 308c as a voice command to transmit the speech of the occupant 308c. The controller 114 may instruct the wireless network 312 of the vehicle 302 to transmit the speech of the occupant 308c, or the controller 114 may instruct personal device 310 to transmit the speech of the occupant 308c through a cellular or other network.

The speech of the surrounding occupants 308a, 308b, 308d, 308c, 308f may also be received by the microphone 112 and audio signal data representative of the speech of the surrounding occupants 308a, 308b, 308d, 308e, 308f may be provided to the controller 114. The controller 114 may receive vibration signals from the vibration sensors 332a, 332b, 332d, 332e, 332f adjacent the surrounding occupants 308a, 308b, 308d, 308e, 308f. The controller 114 may identify the speech of the surrounding occupants 308a, 308b, 308d, 308e, 308f by the vibration signals and designate this speech as noise. The controller 114 may thus instruct the wireless network 312 or personal device 310 to suppress, cancel or otherwise prohibit transmission of the speech of the surrounding occupants 308a, 308b, 308d, 308e, 308f. In this manner, the voice recognition system 300 may cancel any noise that is not the speech of the occupant 308c and provide clarity for a videoconference or voice call.

Although various embodiments and methods have been shown and described, the disclosure is not limited to such embodiments and methods and will be understood to include all modifications and variations as would be apparent to one skilled in the art. Therefore, it should be understood that embodiments of the disclosure are not intended to be limited to the particular forms disclosed. Rather, the intention is to cover all modifications, equivalents and alternatives falling within the spirit and scope of the disclosure as defined by the appended claims.

What is claimed is:

1. A voice recognition system for operating a controlled device on board a vehicle, the system comprising:
    a microphone;
    at least one vibration sensor disposed in an interior of the vehicle;
    one or more processors; and
    a computer readable medium storing instructions thereon that cause the one or more processors to:
      receive audio signal data from the microphone;
      receive vibration signals from the one or more vibration sensors;
      detect a voice command from the audio signal data;
      match the voice command to a vibration sensor signature detected within the vibration signals; and
      operate a controlled device in response to matching the voice command to the vibration sensor signature, wherein the instructions further cause the one or more processors to update a match criteria for matching the voice command to the vibration sensor signature in response to detection of clothing articles on an occupant of the vehicle, wherein reliance on the vibration sensor signature is reduced.

2. The system as defined in claim 1, wherein the at least one vibration sensor is associated with one of a plurality of passenger zones defined within the interior of the vehicle, and wherein the instructions further cause the one or more processors to operate the controlled device within the one of the plurality of passenger zones.

3. The system as defined in claim 2, wherein the controlled device comprises an adjustable seat or window.

4. The system as defined in claim 2, wherein the instructions further cause the one or more processors to instruct the controlled device to transmit speech of an occupant of the one of the plurality of passenger zones and prohibit transmission of the speech of an occupant of a surrounding passenger zone.

5. The system as defined in claim 1, wherein the at least one vibration sensor includes at least a first vibration sensor supported on a steering wheel of the vehicle.

6. The system as defined in claim 5, wherein the at least one vibration sensor includes at least a second vibration sensor supported in a foot pedal of the vehicle.

7. The system as defined in claim 1, wherein the instructions further cause the one or more processors to implement a machine learning model to update the match criteria.

8. The system as defined in claim 1, wherein the instructions further cause the one or more processors to:
    detect conflicting voice commands from a driver of the vehicle and another occupant of the vehicle; and
    in response to the detection of conflicting voice commands, giving priority to the driver of the vehicle.

9. A computer-implemented method for operating a controlled device on board a vehicle, the method comprising:
    receiving audio signal data from a microphone disposed in an interior of the vehicle;
    receiving vibration signals from one or more vibration sensors disposed within the interior of the vehicle;
    detecting a voice command from the audio signal with a voice recognition routine;
    matching the voice command to a vibration sensor signature within the vibration signals data using at least one processor;
    operating a controlled device in response to matching the voice command to the vibration sensor signature; and
    updating a match criteria for matching the voice command to the vibration sensor signature in response to detection of clothing articles on an occupant of the vehicle, wherein reliance on the vibration sensor signature is reduced.

10. The computer-implemented method as defined in claim 9, further comprising identifying an occupant issuing the voice command with the vibration signals.

11. The computer-implemented method as defined in claim 10, wherein operating the controlled device is implemented within one of a plurality of passenger zones in which the occupant is located.

12. The computer-implemented method as defined in claim 11, further comprising instructing the controlled device to transmit speech of the occupant issuing the voice command and prohibit transmission of speech of occupants located in surrounding passenger zones.

13. The computer-implemented method as defined in claim 9, further comprising:
    detecting a corrective action undertaken in response to operating the controlled device; and
    updating a match criteria for matching the voice command to the vibration sensor signature in response to detecting the corrective action.

14. The computer-implemented method as defined in claim 9, wherein the controlled device is an adjustable seat or a window.

15. The computer-implemented method as defined in claim 9, wherein a voice command of a driver is given priority over a voice command of other vehicle passengers.

16. A non-transitory computer-readable medium having machine-readable instructions stored thereon, which are executable to cause a machine to perform operations comprising:

receiving audio signal data from a microphone disposed in an interior of the vehicle;

receiving vibration signals from one or more vibration sensors disposed within the interior of a vehicle;

detecting a voice command from the audio signal with a voice recognition routine;

matching the voice command to a vibration sensor signature within the vibration signals data with at least one processor;

instructing a controlled device to operate in response to matching the voice command to the vibration sensor signature, wherein the controlled device comprises an adjustable seat or window; and updating a match criteria for matching the voice command to the vibration sensor signature in response to detection of clothing articles on an occupant of the vehicle, wherein reliance on the vibration sensor signature is reduced.

17. The non-transitory computer-readable medium as defined in claim 16, wherein the machine-readable instructions are further executable to cause the machine to identify an occupant issuing the voice command with the vibration signals.

18. The non-transitory computer-readable medium as defined in claim 16, wherein the machine-readable instructions are further executable to instruct the controlled device to transmit speech of an occupant issuing the voice command and prohibit transmission of speech of surrounding occupants.

19. The non-transitory computer-readable medium as defined in claim 16, wherein the machine-readable instructions are further executable to:

detect a corrective action undertaken in response to operating the controlled device; and update a match criteria for matching the voice command to the vibration sensor signature in response to detecting the corrective action.

* * * * *